United States Patent [19]

Vetter

[11] Patent Number: 4,643,398

[45] Date of Patent: Feb. 17, 1987

[54] RUBBER PNEUMATIC RECTANGULAR PAD

[76] Inventor: Manfred Vetter, Burg Langendorf, 5352 Zulpich, Fed. Rep. of Germany

[21] Appl. No.: 704,634

[22] Filed: Feb. 22, 1985

[30] Foreign Application Priority Data

Feb. 28, 1984 [DE] Fed. Rep. of Germany ... 8406021[U]

[51] Int. Cl.⁴ .............................................. B66F 3/24
[52] U.S. Cl. ............................................. 254/93 HP
[58] Field of Search ................... 254/93 HP; 428/12; 5/434, 441

[56] References Cited

U.S. PATENT DOCUMENTS

| 4,036,472 | 7/1977 | Orndorff | 254/93 HP |
| 4,067,544 | 1/1978 | Vetter et al. | 254/93 HP |
| 4,104,425 | 8/1978 | Hirmann | 254/93 HP |

Primary Examiner—Robert C. Watson
Attorney, Agent, or Firm—K. S. Cornaby

[57] ABSTRACT

A pneumatic pad has each face thereof reinforced by three reinforcing layers over the whole area of the face. A preferred embodiment is constructed of unvulcanized rubber material, then vulcanized to remove all entrapped air in a hot press.

9 Claims, 4 Drawing Figures

U.S. Patent  Feb. 17, 1987  4,643,398
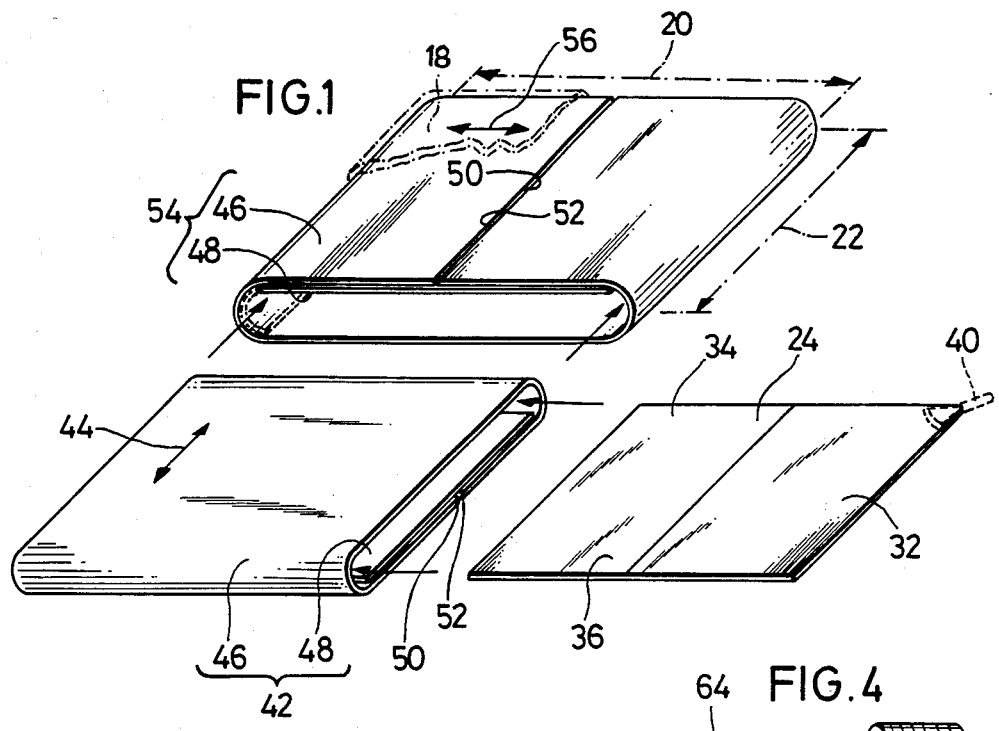
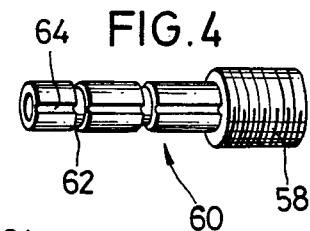
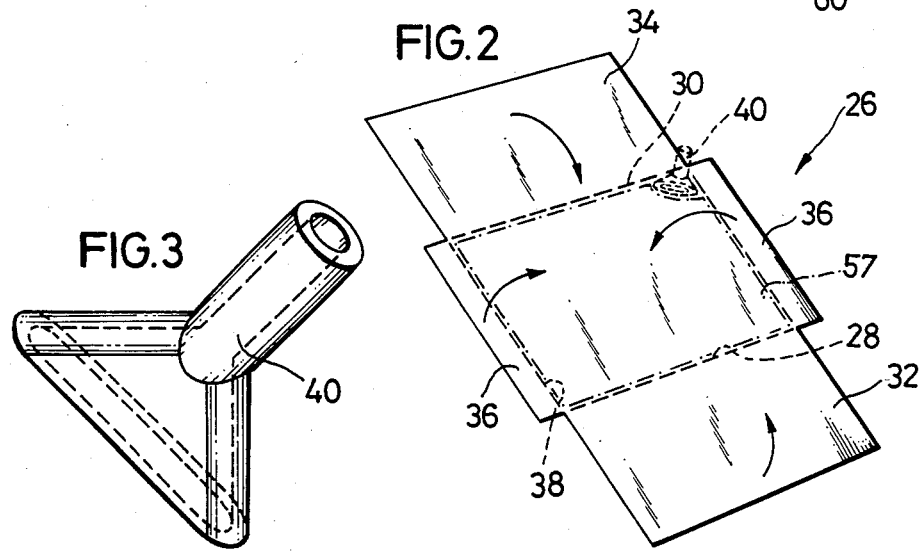
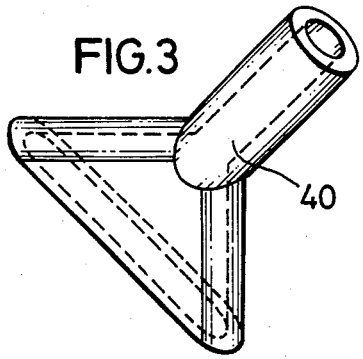

RUBBER PNEUMATIC RECTANGULAR PAD

BACKGROUND OF THE INVENTION

The invention relates to a pneumatic pad made of a rubber material which is hot-vulcanized in a press.

Prior art pneumatic pads are made of a rubber material which is vulcanized in a hot press. Such a pad has a rectangular shape and incorporates an airtight envelope arranged inside of, and connected to, a connection device positioned in a corner and accessible from outside.

The pad has a first layer of a cord and special steed-cord reinforced flat rubber material arranged outside this envelope, the direction of reinforcement running parallel to the second side of the rectangle. The layer has a rectangular cut having a width which substantially equals the length of the first side of the rectangle, and a length which is not essentially shorter than the double length of the second side of the rectangle. The layer is bent around edges running parallel to the first side of the rectangle.

The pad has a second layer likewise of a cord, especially steelcord reinforced material arranged outside the first layer, with the direction of reinforcement running parallel to the first side of the rectangle. This layer exhibits a cut of rectangular shape having a width which essentially equals the length of the second side of the rectangle and a length which is not essentially shorter than the double length of the first side of the rectangle. The pad has turned-under edges running parallel to the second side of the rectangle. So that the turned-under regions of this second layer are on the other side of the pad opposite the turned-under regions of the first layer.

The pneumatic pads disclosed in U.S. Pat. No. 4,372,533 have a cut for a first and second layers, the length of which is chosen in such a way that the turned-under edges overlap in each case. U.S. Pat. Nos. 4,067,544 and 4,143,854 also show this feature. The overlap of the pad shown in U.S. Pat. No. 4,372,533 is extended so far that the overlap area is greater than 75% of the total area of the rectangle defining the pads. The cord-reinforced flat rubber material is similar to the continuous weblike rubber material used in the tire industry and is reinforced by fabric. The reinforcing cords only run in one direction through the fabric (the beam), while the other direction is constituted of threads of lesser tensile strength. This reinforcing fabric is embedded in an initially unvulcanized rubber material.

During the production of prior art pneumatic pads by hot-vulcanization press molding, the unvulcanized inner envelope and unvulcanized two outer layers are assembled together as described above and laid into the press. With the step of hot-vulcanization, the overlapping regions of the envelope combine and form an airtight arrangement. At the same time, the contacting surfaces between the outer surface of the envelope and the inner surface of the first layer, as well as the outer surface of the first layer and the inner surface of the second layer, enter into an intimate bond. During this step, care has to be taken that the bond extends over the entire area of the pad. Any air enclosures or bubbles between the envelope and the first layer and between the first and the second layer must be carefully avoided by appropriate means. Due to the high loads a pneumatic pad experiences in practical operation, enclosed air bubbles will become compressed and force an at least partial separation of joined surfaces, i.e. split the pad. Enclosures of air must therefore be avoided during the manufacture of any pneumatic pad and especially before the step of hot-vulcanization is performed.

In the pad or cushion of the U.S. Pat. No. 4,372,533, the cuts for the first and the second layer overlap as described above. The thickness of the pad abruptly changes at the end sections of these overlaps. Thus, a danger exists that slender, lengthly air compartments are formed at the two edges of the cut running crosswise to the direction of reinforcement, which may initiate the tearing apart or cracking mentioned above. To inhibit this cracking, small strips which are not further designated or described are inserted. The task of these strips evidently is to avoid a sharp step within the side faces of the pad. The strips are positioned in such a way on the edges of the two layers, that they extend the overlapping regions to the change-over at the edges of the pad. Four additional strips are necessary which have to be positioned with care during the manufacture of the pad. Even if this operation is performed with care, gaps are inevitably formed and are left open between the additional strips and the edges of the first or second layer. Such gaps are already visible in the figures of the U.S. Pat. No. 4,372,533. The additional strips do not abut flush against the edges of the cuts.

The known prior art pads consequently have the disadvantage that four additional strips are needed during the manufacture, and these strips have to be positioned specially and carefully. In spite of this expenditure, as described above, no definite security is reached that no air enclosures appear within the walls of the pad.

It is an objective of the invention to avoid the disadvantages of the known pneumatic pads, and to improve this pad to the extent that the individual plies or beds establishing the pad are so joined that virtually no air enclosures can appear.

SUMMARY OF THE INVENTION

A pneumatic pad of the invention has a first layer consisting of a first cut and a second cut, whereby the two edges of the turned-under regions of the first cut (which run crosswise to the direction of reinforcement) are very close to each other. Preferably, the two edges abut without reciprocal overlap and the second cut is positioned under these regions, but does not extend into the edges of the pad running crosswise to the said direction of reinforcement.

The second layer preferably consists of a first cut and a second cut, whereby the edges of the turned-under regions of the first cut which run crosswise to its direction of reinforcement are very close to each other. These edges preferably abut without any reciprocal overlap, with the second cut being positioned under these regions and not extending into the edges of the pad which run crosswise to the direction of reinforcement.

A pneumatic pad or cushion of the invention obtains the result that each face of the pad is reinforced by three reinforcing layers over the whole area of this face. This is in contrast to the known pads which in the region of the additional strips only exhibit a double reinforcement leading to an increased possibility of rupture or localized cracking. The pad according to the invention is completely and uniformly reinforced on both faces.

Preferably, the blunt and flush abutment of the edges of the turned-under regions of the two first cuts excludes practically any enclosure of air. The cutting in these regions may be performed during the manufacture of the partially assembled pad, whereby the two sections of the turned-under regions initially overlap. Independent of the course taken during cutting, the two edges fit exactly and air gaps are safely avoided.

The two additional second layers advantageously bridge the abutment region of the respective first cut, so that the local interruption of the reinforcement will not have a negative effect. Preferably, the transition regions between the edges of the turned-under regions are on a median line of the pad, so that essentially symmetrical loading occurs and the greatest possible area of overlap between each of the two turned-under sections of the first cut and the second cut is obtained.

One second cut is positioned in each face of the pad. Contrary to the first cut, the second cut does not continuously run through an edge of the pad. In summing up, a precise laminated structure is obtained having no steps between material of different thickness within a respective face. Different thicknesses, i.e. steps, only appear in the edge region of the pad, where they are sufficiently smoothed and do not lead to enclose volumes of air.

The walls of the pneumatic pad according to the invention are, as described above, continuously, completely and uniformly reinforced three times, the edge regions, however, only exhibit a single reinforcement. In a preferred embodiment of the invention, it is suggested to improve the reinforcement of the edge regions by narrow strips which are bent into U-shape and exhibit cord threads running parallel to the direction of reinforcement of the first cuts, onto which the strips are positioned. Thus, the resistance against a tear-out in the direction of the load is increased.

In a preferred improvement of the invention, the envelope is made of natural rubber, especially in form of a single piece cut. The envelope is not prevulcanized and not yet established before hot-vulcanizing in the press at the same time as the other steps of vulcanization are performed. By means of a parting compound or agent, especially a separating foil, any adhesion during vulcanization between the two faces of the cushion is avoided. The cut for the envelope is preferably one single piece and has essentially rectangular shape, whereby the length of this cut is greater than the length of one side of the rectangle, so that the over-turned end sections of the cut for the envelope overlap. Additionally the cut for the envelope exhibits lateral, narrow sections or tabs to be turned over, these sections protrude along the long sides and are facing each other. Their length essentially equals the length of the said side of the rectangle of the cushion. During manufacture of the inner tire, these narrow sections to be turned over are first folded towards the inside, then the other sections extending over the area of the pad are folded to overlap. In summary, an envelope is formed, which may be filled up to its outer margin, to avoid a waste of volume near the margins.

In a preferred further embodiment, a protecting strip, e.g. made of a fabric, is positioned inside the steelcord reinforcement of the edges of the pad in order to protect the envelope from pressing against or protruding from the reinforcement.

In a specially preferred embodiment of the invention, either a rubber nipple is connected to the envelope and vulcanized (in which case a metallic fitting can be inserted and fixed by a hose clip or equivalent), or a metallic nipple is permanently bonded on the envelope and has a cylindrical outer surface with axial and radial grooves for improving clamping. A replaceable metallic fitting gives the advantage that in case of damage of the thread of the fitting, it may be easily replaced; whereas in a permanently attached metallic nipple in principle the thread can be rethreaded. Nevertheless, such a replacement has limited practicality, because often the pad has to be thrown away if the metallic nipple is damaged.

Finally in a further preferred embodiment of the invention, the outer layers of the pad are made of a relatively free-flowing material unvulcanized before vulcanization in the press. Due to this increased flowability unknown in the state of the art, cavities otherwise left open are filled, and the marginal sections are smoothed easily and filled.

THE DRAWING

Further advantages and characteristics of the invention result from the claims and the following description of a non-limiting embodiment which will be specifically explained by reference to the drawing. In this drawing:

FIG. 1 shows a perspective view of an envelope and a first and a second layer to elucidate the set up, but not the individual steps during manufacture of the pad according to the invention;

FIG. 2 shows a perspective view of a one-piece-cut for the envelope;

FIG. 3 shows a perspective view of a rubber nipple, and

FIG. 4 shows a perspective view of a metallic fitting.

DETAILED DESCRIPTION OF THE PREFERRED EMBODIMENTS

FIG. 1 principally shows the assembly of the pneumatic pad, an outer covering layer 18 being only partly shown in broken lines. Such an outer covering layer is already known from U.S. Pat. No. 4,372,533, where it is called an outer envelope. It forms an outer, continous layer embedding all inner layers. The finished pad is manufactured in a single step of vulcanization in a press using hot-vulcanization. The pad is made starting from endless, weblike rubber material which is cut into the shape required. This material is unvulcanized before hot-vulcanization takes place. The cushion is of rectangular shape, defined by a first and a second side 20, 22 of the rectangle, delimiting the area of the cushion. The embodiment shown has a square shape.

FIGS. 1 and 2 show an airtight respectively watertight envelope 24 forming the inner part of the pad. This envelope 24 is made starting from a cut 26 of essentially rectangular shape and cut from unvulcanized continuous material. The length of the cut 26 is greater than the double length of one side of the rectangle, in the embodiment shown of the first side 20. By this fact during a subsequent folding of the cut 26 along folding lines 28, 30 the turned-under regions 32, 34 overlap, whereby this overlap typically amounts to 20% of the length of the said side 20.

The width of the cut 26 essentially equals the length of the second side 22. The cut 26 shows tabs 36 facing each other exactly and having a width of several centimeters. Their length almost equals the length of the first side 20. They terminate in close proximity of folding lines 28, 30. These tabs 36 are folded along folding lines 38. The folding along these folding lines 38 preferably is the first step. The folding along the folding lines 28, 30 is performed subsequently. Arcuate arrows in FIG. 2 show the steps of folding. Before folding starts, a nipple 40 is inserted in one corner of the pad. The nipple used is a rubber nipple 40 as shown in FIG. 3. A metallic fitting 60 is not yet attached, but may be releasably or permanently attached. Such a metallic fitting 60 is shown in FIG. 4.

The folded envelope 24 takes the shape shown in FIG. 1. Contrary to the representation shown in FIG. 1, the prefabricated, but not yet vulcanized envelope 24 is not inserted into an already folded first layer 42. The folding of the first layer 42 into the shape shown does not start before the envelope 24 has been placed on it. As shown in FIG. 1, the first layer whose threads of reinforcement run parallel to the second side 22 (direction of reinforcement 44) is made of a first, rectangular cut 46 and a second, likewise rectangular, but smaller cut 48. In both cuts 46, 48 the cord reinforcement (not shown) runs in direction of reinforcement 44. Both cuts 46, 48 have the same widths which is equal to the length of the first side 20. The length of the first cut 46 is chosen in such a way, that its two edges 50, 52 exactly abut without any air gap, whereby a flush and edgeless abutment is obtained which is located in the middle of the pad. The second cut 48 is positioned immediately under this just-described region showing the abutment. Its length equals generally the length of the second side 22.

The second layer 54 essentially is manufactured in the same way as the first layer 42, with the exception that all directions and dimensions are shifted around 90 degree. Furtheron, the region incorporating the edgeless abutment of the edges 50, 52 is with respect to the first layer 42 within the other face of the pad. Consequently, in each face of the pad there is one line with interrupted reinforcement, in any case two lines with flush abutment are not in the same face of the pad. The direction of reinforcement 56 of the second layer 54 runs orthogonally to the direction of reinforcement 44 and as the latter within the plane of the faces of the pad.

During manufacture the individual layers are subsequently superposed and carefully pressed and contacted by means of a roll in order to avoid any enclosures of air. Such enclosures would breath during inflating and evacuation of the pad and give rise to a start of further separation.

The two cuts 46 of the two layers 42, 44 are preferably folded over a radius in the region of the edges of the pad. A sheet of metal has proven successful. Such a folding is especially necessary in case of a sturdy reinforcement.

Vulcanization in one single step is especially typical for the pneumatic pad according to the invention. The envelope 24 is initially non-prefabricated, especially not pre-vulcanized. It is folded in the unvulcanized state of rawness and a real impervious liner or envelope is realized in the single step of vulcanization. A parting foil 57 (indicated in FIG. 2) inhibits vulcanization of the area within the folding lines 28, 30 and 38 and the surface of the tabs 36 as well as the contacting surfaces of the regions 32, 34.

FIG. 2 shows a rubber nipple 40 oriented diagonally and inserted into a region of a corner of the pad. This nipple 40 is further shown in FIG. 3. It incorporates two isoceles and rectangular triangles joined along their cathetusses and linked at the vertex with a tubelike nozzle having an aperture. This rubber nipple 40 is contrary to all parts of pneumatic pads described previously to assure that it keeps its shape during hot-vulcanization.

The triangularly-shaped regions ensure a large area for the bond between the nipple 40 and the adjacent corner regions of the envelope 24, so that the nipple 40 is sufficiently secured against extraction. A metallic fitting 60 or connection piece can be inserted into the tubelike nozzle of the nipple 40 and can be releasably or fixedly attached with a tube clamp. Such a metallic fitting 60 is shown in FIG. 4.

The fitting 60 incorporates an essentially cylindrical tube designed to enter into the nozzle of the nipple 40 and having a thread 58 protruding outside the nipple 40 when the fitting is inserted into the nozzle. The cylindrical tube exhibits radially- as well as axially-running grooves 62, 64 which restrain a pull-out or a rotation of the fitting 60. This is especially favorable if the metallic fitting 60 is permanently fixed.

Alternatively, the envelope 24 may be made of two cuts, e.g. a cut having four marginal tabs and a second cut having dimensions almost equal to the rectangle of the first side 20 and the second side 22.

As indicated in FIG. 1, protecting strips 66 may be positioned along the inner bent surfaces of the first cuts 46. Only one protecting strip is shown, though a total of four are employed. As shown in FIG. 1, they perfectly abut at one edge with one edge of a second cut 48. They are made of a cord reinforced fabric, the direction of reinforcement running orthogonally to the direction of reinforcement of the abutting second cut 48.

I claim:

1. Pneumatic pad made of a rubber material which is hot-vulcanized in a press, weblike and un-vulcanized before performing the step of hot-vulcanization, said pad having rectangular shape defined by a first and a second side of a rectangle, said pad incorporates an airtight envelope arranged inside and connected to a connection device positioned in a corner and accessible from outside;

a first layer of a cord reinforced flat rubber material arranged outside this envelope, the direction of reinforcement running parallel to the said second side of the rectangle; and a second layer of a cord reinforced material arranged outside the said first layer, the direction of reinforcement running parallel to the first side of the rectangle;

wherein the said first layer and the said second layer each consist of a first cut and of a second cut, the first cut of each layer exhibits a rectangular shape, and has a width which substantially equals the length of the side of the pad running crosswise to the direction of reinforcement of the respective layer, and a length which is approximately the double length of the side of the pad running parallel to the direction of reinforcement, and the said first cuts being bent around edges running parallel to the side of the pad which lies crosswise to the direction of reinforcement of the respective layer, and turned-under regions are formed whereby the two edges of the turned-under regions of each first cut abut without reciprocal overlap; and the second cut of each layer is rectangularly shaped, and is not larger in area than the area of the pad itself, and is positioned under the said regions abutting without reciprocal overlap of the respective first cut, and does not extend into the edges of the respective layer running crosswise to its direction of reinforcement.

2. Pneumatic pad according to claim 1, characterized in that the abutting faces of the edges of both layers are on the middle-line of the pad.

3. Pneumatic pad according to claim 1, characterized by an essentially rectangularly-shaped cut for the airtight envelope having a length which is greater than the double of one side of the rectangle, so that overlap appears, and a width equal to the length of the other side of the rectangle; said cut further exhibits slender tabs facing each other and positioned at the long sides, the length of said tabs essentially equalling the length of one side of the rectangle.

4. Pneumatic pad according to claim 1, characterized in that the said airtight envelope is made of weblike natural rubber and exhibits interposed means for separation, and is folded and hot-vulcanized together with the said two layers.

5. Pneumatic pad according to claim 1, characterized in that, the said connection device is a rubber nipple and a metallic fitting attached to said pad which can be releasably inserted into said rubber nipple and whereby the metallic fitting is clamped in the rubber nipple.

6. Pneumatic pad according to claim 1, characterized by strips of fabric which are positioned between the edge regions of the first cuts on the envelope.

7. Pneumatic pad according to claim 5, characterized in that the said metallic fitting has radial and axial grooves on its outer jacket.

8. Pneumatic pad according to claim 1, having a cover layer arranged outside the second layer, wherein said cover layer is comprised of a relatively free-flowing, unvulcanized material.

9. Pneumatic pad according to claim 1, wherein the reinforcement of the said two layers is a steelcord reinforcement.

* * * * *